June 3, 1969  P. E. BENNER  3,448,026
REMOVAL OF IONS FROM AN IONIZED LIQUID
Filed May 20, 1966

Inventor
Philip E. Benner
by Max A. Farner
His Attorney

Inventor
Philip E. Benner
by Max J. Garner
His Attorney

United States Patent Office 3,448,026
Patented June 3, 1969

3,448,026
REMOVAL OF IONS FROM AN IONIZED LIQUID
Philip E. Benner, 1739 Randolph Road,
Schenectady, N.Y. 12308
Filed May 20, 1966, Ser. No. 551,754
Int. Cl. C02b 1/82; B01d 13/02
U.S. Cl. 204—180                            14 Claims

ABSTRACT OF THE DISCLOSURE

An ionized solution is passed in contact with rotating bipolar electrodes which adsorb ions on one side from a central chamber and repel these same ions into other chambers on opposite sides of the rotating electrodes. Stationary electrodes in the second chambers promote continuance of the ionic flow.

---

This invention relates to the removal of ions from an ionized liquid, by a combination of electrical and mechanical actions. Ionized solutions or liquids may contain both cations and anions and either or both may be removed from a liquid in accordance with this invention. Removal of both cations and anions is useful in the desalination of water.

An object of this invention is to provide novel, simple, practical and inexpensive methods and apparatus for removing ions from an ionized solution or liquid, which may be continuous in operation, and which apparatus is relatively compact, effective and durable.

Other objects and advantages will appear from the following description of the examples of the invention and the novel features will be particularly pointed out in the appended claims.

According to the invention the ionized solution is passed as a confined stream, and portions of it diverted aside as a plurality of thin streams. Electrical polarities are used to attract from the liquid in the main stream the cations and anions into separate ones of the thin streams, all in a continuous operation. This operation may be performed on the main stream a plurality of times in succession until all of the ions are removed from the main stream.

Figure 1:
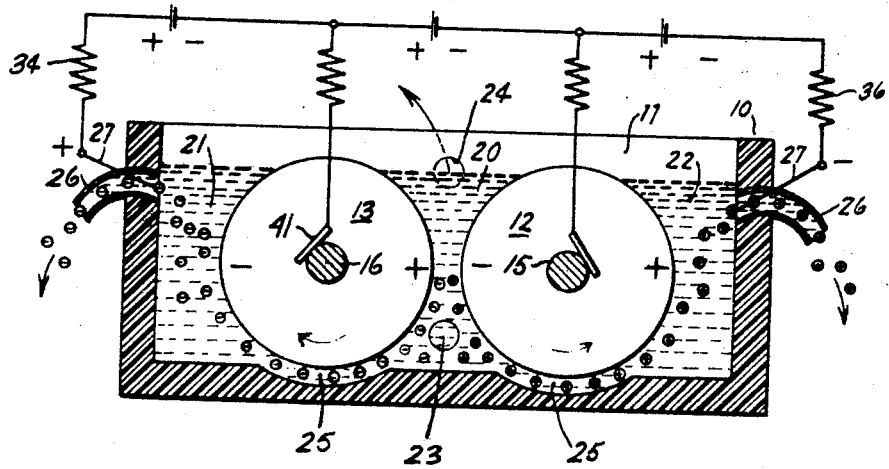
FIG. 1 is a schematic sectional elevation of a simple apparatus constructed in accordance with this invention, the section being taken approximately along the line 1—1 of FIG. 2.
Figure 2:
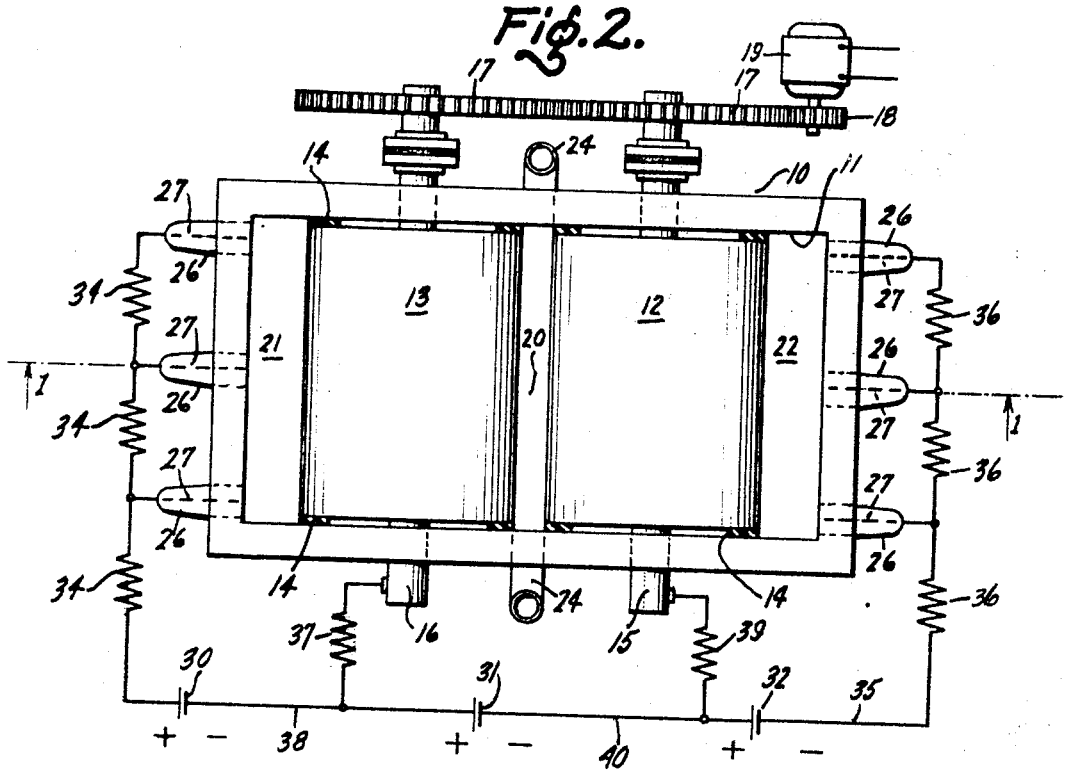
FIG. 2 is a schematic plan of the same.

In the example of the invention illustrated in FIGS. 1 and 2, the apparatus employs a rectangular container or casing 10 of suitable insulating material such as an electrically insulating plastic, and within its chamber 11 are disposed side by side, but in spaced relation to one another, two electrodes 12 and 13 that have peripheral surfaces which are like surfaces of generation and circular in cross section. In the illustrated example they are of cylindrical shape and are mounted for rotation about their longitudinal axes. For this purpose the electrodes 12 and 13 have their ends sealed to the opposite end walls of the container by sealing rings 14 and are mounted on shafts 15 and 16 respectively that extend through the opposite ends of the container for bearings and are suitably sealed or fitted to prevent leakage from the container along them. The shafts 15 and 16 at one end of, but outside of, the container have fixed thereon gears 17 that mesh with one another, and one of them meshes with a pinion 18 that is driven by a motor 19 or other suitable source of power.

The cylinders partition the chamber 11 of the container into a center or main space 20 and two separate side spaces 21 and 22. An inlet for the mineralized or ionized liquid opens into the chamber 11 near the bottom of the chamber at one end. This inlet 23 opens into the main or center space. An outlet 24 leads from said chamber at the opposite end of the main or center space 23 but at a level that determines the maximum liquid level in the container. The liquid level is below the upper sides of the cylinders so that the cylinders are not fully immersed in the liquid. Each cylinder has a close clearance with the bottom of the container and thin spaces or passages 25 between the bottom sides of cylinders and the bottom of the chamber of the container. The bottom wall of the container may have its upper surface made cylindrically concave adjacent to the cylinders with the same radius of curvature as the cylinder so that the thin passages 25 will extend along the cylinders for a substantial distance and have about the same small depths for most of their lengths.

The container has a plurality of outlets 26 in each side wall, leading from the side spaces at levels at or below the level of the outlet 24 from the main space. A reject electrode 27 is disposed in each side outlet 26, preferably to extend to the chamber 11. The gears 17 rotate the cylinder electrodes in opposite directions and in directions to carry the surfaces of the cylinders, that with the bottom wall define the thin passages, from the main space to the side spaces along the thin passages. The cylinders in rotating will by friction on the liquid in the main space and in the thin passages, urge some of the liquid of the main stream along the thin passages into the side spaces from which it escapes through the outlets 26. In this respect the rotating cylinders exert a pumping action on the liquid to divert some of the liquid from the main stream in the center or main space into the side spaces while moving in contact with or in close proximity to the cylinders.

A plurality of sources of small DC potential, such as dry batteries 30, 31, and 32 are connected by wires in series with one another, with one terminal of the series connected by wire 33 through resistances 34 to each of the reject electrodes 27 in the outlets in one side space, and the other terminal of the series is connected by wire 35 and resistances 36 to each of the other reject electrodes 27 that are in the outlets of the other side space. There is a resistance 34 between each of the electrodes 27 at one side of the container, and also a resistance 36 between the electrodes 27 at the other side of the container. A resistance 37 is connected between the wire 38 that connects batteries 30 and 31 and the shaft 16 at the rotatable cylindrical electrode 13. Another resistance 39 is connected between the wire 40 that connects together batteries 31 and 32 and the shaft 15 of the cylinder electrode 12. The connection of each resistance to a shaft 15 or 16 is by a brush 41 (FIG. 1) that bears on the shaft. With the polarities of the batteries connected as shown in FIGS. 1 and 2, it will be observed that the polarity of each cylinder on one side of it will be of opposite kind from the polarity on the other side of it, and the polarities of the sides of the cylinders adjacent to one another at opposite sides of the main or center space will be opposite from one another. The polarities of the electrodes 27 in the outlets at each side of the container will be opposite in kind from the polarity of the nearest side of the nearest cylindrical electrode. As the cylinders rotate the polarities of the DC potentials that are impressed on the cylinders will not rotate but will be the same. For the cylinder 13, the polarity of the side toward the main or center space will be positive for example, and this continues down the side of the electrode into the thin passage 25 and then as the surface of the electrode is about to leave the thin passage the polarity will change to negative.

The cations in the liquid in the center or main space will be attracted toward the surface of the positively charged side of cylinder electrode 13 and will follow it in the thin stream into the side space as the cylinder rotates, until the polarity of the cylinder surface becomes negative and then the cations are repelled from the cylinder into the liquid in the side space that is moving toward an outlet of the side space. The reject electrodes 27 in the outlets at that side being positive in polarity will attract the cations toward and into the liquid leaving by the outlets so that they are definitely removed from the main stream and discarded.

At the same time the anions in the liquid in the center or main space will be attracted to the surface of the electrode 12 and move with it into and through the thin passage 25 toward the other side space. There the polarity changes to positive and the anions will be repelled by the cylinder at the side of the cylinder in the side space. The repelled anions will be attracted toward the negative polarity reject electrodes 27 in the outlets 26 at that side of the container. The liquid in the thin passages as moved by the rotation of the cylinders will carry with it the ions that are attracted to the cylinders. The reject electrodes 27 in or near the outlets aid in getting the ions into the outlet streams.

Figure 5:
FIG. 5 is a diagram illustrating a battery of ion removal devices connected in series or tandem.

To be reasonably certain of getting all of the ions out of a liquid, a plurality of these removal units may be provided and the main liquid passed through them in succession in stages as illustrated in FIG. 5. One of the rotating electrodes is preferably but not necessarily coated with or fabricated of a material that is a cation adsorptive and the other with a material that is anion adsorptive.

In the operation of this apparatus, the ionized liquid or mineralized solution is introduced into one end of the center or main space near the bottom thereof. Anions are attracted toward one revolving electrode and cations are attracted towards the other revolving electrode. The revolving movements of the cylindrical electrodes result in the transport of ions attracted to and in the vicinity of the electrode surfaces through the thin passages between the electrodes and the bottom of the container into the outer or side spaces of the container chamber where they are repelled due to the change in polarity of a part of the electrode surface. It will be noted that any particular part of the surface of a cylindrical electrode changes its polarity in going from the center space to the side space so that the ions attracted to the electrodes in the center space are repelled therefrom in the side spaces.

Figure 3:
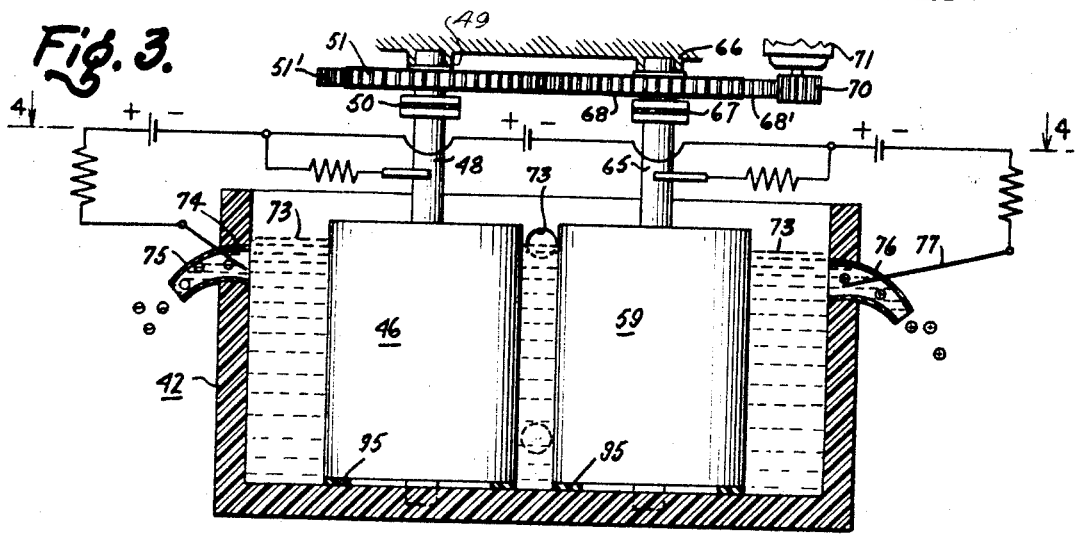
FIG. 3 is a schematic sectional elevation of another apparatus also constructed in accordance with the invention, the section being taken approximately along the line 3—3 of FIG. 4.
Figure 4:
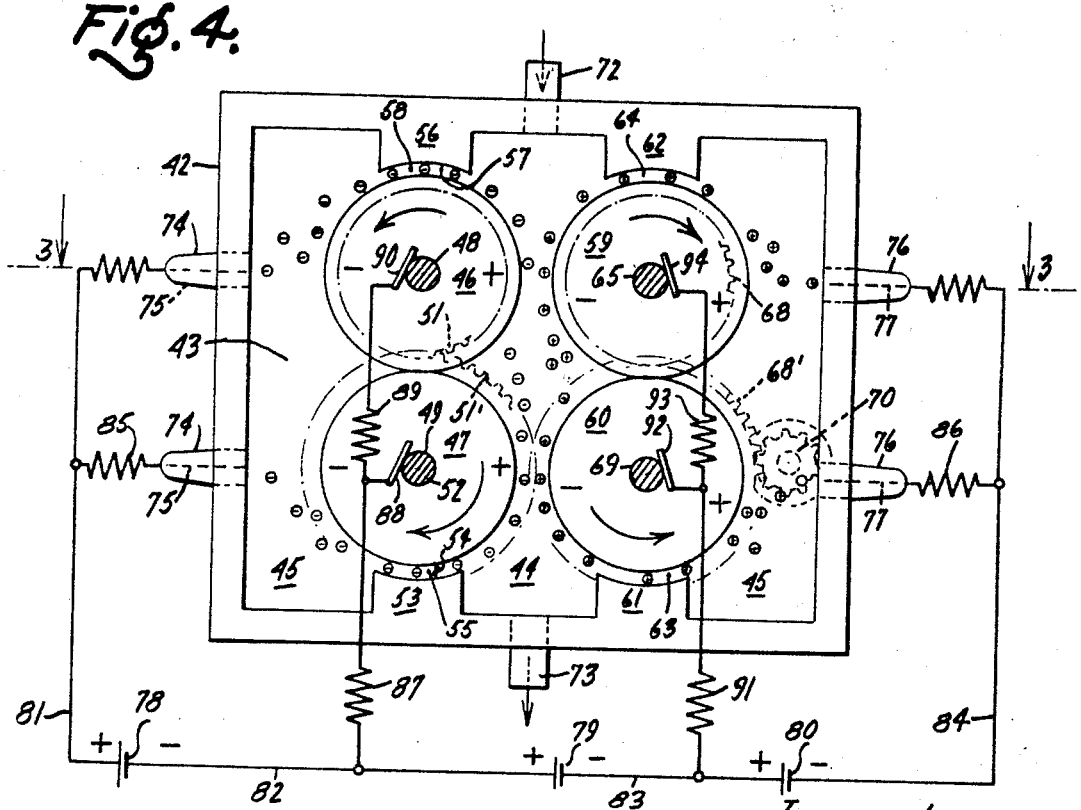
FIG. 4 is a schematic plan of the same, the section being taken approximately along the line 4—4 of FIG. 3.

In the example of the invention illustrated in FIGS. 1 and 2, the cylindrical electrodes are disposed with their longitudinal axes in horizontal positions, but in the example illustrated in FIGS. 3 and 4, the cylindrical electrodes are disposed with their axes vertical or upright. Referring now to FIGS. 3 and 4 a rectangular container 42 is provided with a chamber 43. The chamber 43 is partitioned by two sets of cylindrical electrodes into a center or main space 44 and two side spaces 45. One partition is formed by two cylinders 46 and 47 which abut one another side by side with their axes vertical. The cylinder 46 has a bearing shaft 48 that has a bearing in the bottom wall of the container and its upper end is rotatably received in a bearing 49. An electrically insulating coupling 50 is included in the shaft 48 above the container, and above the coupling 50 the shaft 48 fixedly mounts a gear 51. The cylinder 47 has a bearing shaft 52 that is similar to shaft 48 and at its top has fixed thereon a gear 51' that meshes with gear 51 on shaft 48. The cylinders 46 and 47 by abutting sidewise form a partition that divides the main or center space 44 from the side space 45. One end wall of the container has an abutment or rib 53 that is aligned with the cylinder 47 and its shaft 52 and has an arcuate or partly cylindrical wall 54 that has a center of curvature at the axis of shaft 52 to provide a thin passage 55 between it and the cylinder 47. The opposite end wall has a similar upright rib 56 that extends toward and is aligned with cylinder 46 and its shaft 48, and it also has a concave, partly cylindrical face 57 that has a center of curvature at about the axis of the shaft 48 to provide a thin passage 58 between the cylinder 46 and the end wall of the container.

Two upright cylindrical electrodes 59 and 60 are disposed side by side and abutting one another sidewise form a partition between the center space and the other side space 45. The end walls of the container have ribs 61 and 62, similar to ribs 53 and 56, that extend vertically along the cylinders 59 and 60 and form the thin passages 63 and 64 from the center or main space to the side space 45. The cylinder 59 has a bearing shaft 65 that is rotatably supported by the bottom wall and by a bearing 66 that also has in it an electrically insulating coupling 67. On its upper end it carries a gear 68 that meshes with a similar gear on the upper end of the shaft 69 of the cylinder 60. The gear 68' also meshes with the gear 51', and a pinion 70 meshes with and drives the gear 68'. The pinion is driven by a motor 71.

The container has an inlet 72 at the lower part of one end of the chamber 43 through which the ionized liquid is admitted to the center space. It has an outlet 73 at the opposite end of the center space at a level just below the tops of the cylinders. One side space of the chamber 45 has a plurality of outlets 74 in each of which is a reject electrode 75 and the other side space has a plurality of outlets 76 in each of which is a reject electrode 77. These outlets 74 and 76 are at or slightly below the level of the outlet 73 of the main or center space.

A plurality of sources of small DC potential such as dry cells 78, 79, and 80 are connected in series with one another by wires 81, 82, 83 and 84 and one end wire 81 is connected through a resistance 85 to each of the reject electrodes 75 in the outlets 74. The other end wire 84 is connected through resistance 86 to each of the reject electrodes 77 in the outlets 76. The wire 82 is connected through a resistance 87 to a brush 88 that bears on cylinder shaft 52 and further through resistance 89 to a brush 90 that bears on cylinder shaft 48. Wire 83 is connected through a resistance 91 to a brush 92 that bears on shaft 69 of cylinder 60 and further through a resistance 93 to a brush 94 that bears on shaft 65 of cylinder 59.

The ionized liquid or mineralized solution is admitted to the lower part of the main or center space and the motor 71 rotates the cylindrical electrodes 47, 48, 59 and 60 in the directions of the arrows on those cylinders. The polarities on the cylinders will be as marked and of opposite kinds on opposite sides of the center or main space. The cylinders in rotating will frictionally urge thin layers of the liquid in contact with them in the center space to pass through the thin or shallow passages to the side spaces and carry with them the ions that were attracted to the cylinders. The peripheral surfaces of the cylinders 46 and 47 are preferably but not necessarily coated or made of a cation adsorptive material and the peripheral surfaces of the cylinders 59 and 60 are preferably but not necessarily coated with or made of an anion adsorptive material. As the polarities of the cylinder surfaces change in passing through the thin passages, the ions that were previously attracted to a cylinder are repelled and move with the liquid of the thin streams toward the outlets from the side spaces. The polarities of the electrodes in or near the outlets from the side spaces aid in urging the ions into the outlet streams from the side spaces. A series of these ion removal units may have their center spaces connected in series with one another so that the liquid will be treated several times to remove ions. Enough units are connected in series to completely remove all ions from the liquid.

It will be noted that the rotating upright cylindrical electrodes form partitions that divide the chamber of the container into the center or main space and the side spaces. Sealing rings 95 are provided between the bottoms of these cylinders and the bottom wall of the container so that all flow of liquid from the center space to the side spaces will be through the thin passages along the sides of the cylinders.

In FIG. 5 a plurality of ion removal units A, B, and C are connected in series so the liquid leaving the center space in A will be the entering liquid in B, and that leaving the center space in B will be the entering liquid for the center space in C.

Coatings or materials for the electrode peripheries that attract ions are known and for the purpose of the record are disclosed in a publication entitled "1962 Saline Water Conversion Report" issued by the Office of Saline Water, U.S. Dept. of the Interior in January 1963. See p. 31 in a discussion entitled "Demineralization of Saline Water by Electrically Induced Adsorption on Porous Carbon Electrodes."

It will be understood that various changes in the details, steps and materials which have been herein described and illustrated in order to explain the nature of the invention, may be made by those skilled in the art within the principle and scope of the invention as expressed in the appended claims.

I claim:
1. A device for removing ions from an ionized liquid which comprises:
  (a) a container having a chamber,
  (b) a plurality of electrodes disposed side by side but spaced apart in said chamber, mounted for rotation in opposite directions on parallel axes and dividing said chamber into a center space and two side spaces,
  (c) each electrode having a close clearance between its side and a wall of said chamber to provide between them a thin passage from the center space to the adjacent side space,
  (d) means for passing an ionized liquid into one part of said center space and for removing liquid from the opposite part of said center space,
  (e) said chamber having an outlet from each of said side spaces with an electrode in each such outlet,
  (f) means for applying a DC potential to all of such electrodes with adjacent sides of the rotatable electrodes having opposite polarities and the electrode in each outlet having a polarity opposite from that of the adjacent side of the nearest rotatable electrode, and
  (g) said passing means only partially immersing said rotatable electrodes.

2. The device according to claim 1, wherein one of said rotatable electrodes has a cation adsorption surface for its periphery and the other electrode that rotates has an anion adsorptive surface.

3. A device for removing ions from an ionized liquid which comprises:
  (a) a container having a chamber,
  (b) a plurality of cylindrical electrodes disposed side by side in said chamber and mounted for rotation on parallel axes, said electrodes dividing said chamber into a center space between them and side spaces between them and the sides of said chamber,
  (c) means for passing an ionized liquid into one part of said center space and removing liquid from another part of said center space remote from the entrance of the ionized liquid, and maintaining in said chamber a liquid level that only partly immerses said electrodes,
  (d) each of said electrodes having a small thin clearance between a side thereof and the wall of the chamber nearest thereto.
  (e) means connected to said electrodes for rotating them about their axes with adjacent electrodes rotating in opposite directions,
  (f) overflow outlets for said liquid leading from the spaces at the sides of said chamber and an auxiliary electrode in said chamber close to each outlet, and
  (g) means for applying a DC potential across all of said electrodes, with the potentials of the sides of the rotating electrodes at the opposite sides of said center space of opposite polarity and the potential of the electrodes at the outlets being of a polarity opposite from the polarity of the adjacent side of the nearest rotatable electrode.

4. A device for removing ions from an ionized liquid which comprises:
  (a) a container having a chamber,
  (b) a cylindrical electrode disposed in said chamber and mounted for rotation about its longitudinal axis and having a thin clearance with a wall of said chamber and providing a thin passage between them,
  (c) means for passing said liquid through said chamber as a main stream in contact with said electrode at one side thereof,
  (d) said chamber having an outlet at the side of said chamber opposite from said main stream and reached through said thin passage from said main stream,
  (e) a reject electrode in said chamber at the side of the cylindrical electrode having said outlet,
  (f) means for rotating said cylindrical electrode to carry its periphery along said thin passage in a direction from the main stream toward said outlet, and
  (g) means for imposing on said electrodes DC potentials that provide alternate polarities on opposite sides of said cylindrical electrode and on the reject electrode a polarity that is opposite in kind from that of the adjacent side of the cylindrical electrode.

5. The device according to claim 4 wherein said cylindrical electrode has a peripheral surface of an ion adsorptive material that attracts toward said cylindrical electrode ions from said main stream.

6. A device for removing ions from an ionized liquid which comprises:
  (a) a container having a chamber,
  (b) a plurality of electrodes whose peripheral surfaces are surfaces of generation, circular in transverse cross section, disposed side by side in said chamber and dividing it into a center section and side sections, with a thin passage between a side of each such electrode and an adjacent wall of the chamber, said electrodes being mounted for rotation about their axes of generation,
  (c) means for rotating said electrodes about their axes in directions to carry their peripheries along said passages from said center section to a side section,
  (d) means for passing said ionized liquid through said center section of said chamber in contact with said electrodes,
  (e) said chamber having outlets from each side section with a reject electrode in said chamber close to each outlet, and
  (f) means for impressing across said electrodes DC potentials that provide opposite kinds of polarities on opposite sides of each rotatable electrode, opposite kinds of polarities on each rotatable electrode at opposite sides of said center section and polarities on the reject electrodes that are opposite in kind from the polarities on the sides of the rotatable electrodes that are nearest thereto.

7. The device according to claim 6 wherein said rotatable electrodes are only partially immersed in said ionized liquid passing through said center space.

8. The device according to claim 6 wherein said rotatable electrodes have ion attracting surfaces, of cation attracting material on one side of said center section and of anion attracting material on the other side of said center space.

9. The device according to claim 6 wherein said rotating electrodes are cylinders and the outlets are at about the levels of the outlet of the liquid level in the center section.

10. The method of removing ions from an ionized liquid which comprises:
(a) passing said liquid as a main stream through a closed chamber,
(b) disposing in contact with said liquid in said main stream one part of a bipolar rotating electrode with a polarity on one side that attracts to said one part some of said ions,
(c) rotating said electrode to carry with it some of said liquid with attracted ions to a position outside of said stream and there changing the polarity of said one part of said electrode to reject the attracted ions that followed said one part of the electrode,
(d) discharging said removed part of said liquid as an auxiliary stream, and
(e) applying to said liquid of the auxiliary stream a polarity that attracts into the auxiliary stream the ions that are rejected from said electrode.

11. The method of removing ions from an ionized liquid which comprises:
(a) passing said liquid as a main stream through a closed chamber,
(b) dividing said chamber by electrodes that provide with the walls of the chamber a main passage between them for the main stream and thin auxiliary passages along the surfaces of the electrodes to the opposite sides of the electrodes and then out of said chamber,
(c) continuously supplying opposite polarities to the sides of the electrodes that between them define the main passage, and opposite polarities to the sides of the electrodes that are remote from the main passage along said thin passages,
(d) supplying to the liquid adjacent to the outlets of the auxiliary passages a polarity opposite from that at the adjacent sides of the adjacent electrode, and
(e) rotating said electrodes about parallel axes in directions to carry thin streams of the liquid with ions attached to each electrode through said thin passages where the change in polarity rejects the attached ions enabling them to pass out in the thin streams.

12. A device for removing ions from an ionized liquid which comprises:
(a) a container having a chamber,
(b) a plurality of electrodes whose surfaces correspond to surfaces of revolution and are circular in cross section, disposed in said chamber side by side in positions in which they partition said chamber into a center space and two side spaces, with a thin passage between each electrode and a wall of said chamber,
(c) means for passing said liquid through said center space and determining the liquid level in said chamber,
(d) said chamber having outlets from said side spaces below said level of liquid in said center space,
(e) means for rotating said electrodes in directions to move their said surfaces along said thin passages from said center space to said side spaces,
(f) reject electrodes in each side space adjacent an outlet, and
(g) means for applying DC potentials across all of said electrodes, with polarities of said rotatable electrodes at opposite sides of said center space of opposite kinds, and of opposite kinds at opposite sides of each rotatable electrode, and at the reject electrodes of kinds opposite from the adjacent sides of the rotatable electrodes.

13. The device according to claim 12, wherein the surfaces of the rotating electrodes at one side of said center space are of cation attracting material and at the other side of said center space are of anion attracting material.

14. The device according to claim 12 wherein said means for applying DC potentials includes a plurality of sources of small DC potentials connected in series between said reject electrodes, and branch wires connecting opposite sides of an intermediate one of said sources of DC potential to the electrodes at opposite sides of said center space.

References Cited

Moore: "Physical Chemistry," 3rd ed., 1965, Prentice-Hall Chemistry Series, pp. 334, 335, 344, 345, 351, 357, 359 and 360.

Ellis: "Fresh Water from the Ocean," pp. 40–43, 56–69.

JOHN H. MACK, *Primary Examiner.*

A. C. PRESCOTT, *Assistant Examiner.*

U.S. Cl. X.R.

204—149, 268; 210—37, 38